United States Patent [19]

Mueller et al.

[11] Patent Number: 4,831,491

[45] Date of Patent: May 16, 1989

[54] PRECIPITATIVE STATIC DRAIN STRIP SYSTEM

[75] Inventors: Joseph T. Mueller; William W. Hornsey, both of Huntsville, Ala.

[73] Assignee: PPG Industries, Inc., Pittsburgh, Pa.

[21] Appl. No.: 114,943

[22] Filed: Oct. 30, 1987

[51] Int. Cl.⁴ .............................................. H05F 3/02
[52] U.S. Cl. ..................................... 361/218; 244/1 A
[58] Field of Search ............... 361/212, 217, 218, 220; 428/38, 922; 244/1 A, 129.3, 134 D

[56] References Cited

U.S. PATENT DOCUMENTS 2,416,202  2/1947  Naumann ........................... 361/212
4,632,527  12/1986  Masso et al. ..................... 428/922 X Primary Examiner—L. T. Hix
Assistant Examiner—Brian W. Brown
Attorney, Agent, or Firm—Andrew C. Siminerio

[57] ABSTRACT

A device for dissipating static charge collected on the surface of an aircraft window having a plurality of electroconductive film elements on the outboard surface of the aircraft window. The elements are electrically interconnected and grounded such that charges accumulated by the film elements passed there along to the ground. An electrical window heating system may be incorporated into the plies of the window.

13 Claims, 2 Drawing Sheets

PRECIPITATIVE STATIC DRAIN STRIP SYSTEM

BACKGROUND OF THE INVENTION

1. Field of the Invention

This invention relates to a device for preventing substantial static charge buildup on a substrate surface and, in particular, to a precipitative static drain strip system for dissipating static charge on the outboard surface of a laminated aircraft window or add-on window (appendage).

2A. Technical Considerations

Windows used in aircraft typically include several glass and/or plastic layers or plies which are fused or laminated together to form a composite transparent window. As used herein, the term composite ply, transparency, windshield, or window refers to a substrate containing one or more glass and/or plastic layers. In order to remove fog, mist or ice which deposits on the outside or outboard surface of the window during flight, the aircraft windows may include an internally-located electrical device for heating the window. In addition to fog or ice, static electric charge also collects on the outboard surface of an aircraft window during flight. Air flowing over the outboard surface, as well as frictional contact with atmospheric particles such as snow or dust particles striking the window, will deposit an electrical charge on the window surface. The amount of charge that may be accumulated depends on the dielectric strength of the outboard ply of the window as well as the size, i.e. surface area, of the window. For large windows, potentials of 50,000–100,000 volts may be reached. If allowed to build up without some type of auxiliary grounding arrangement, the window may fail due to the static charge reaching an electric potential sufficient to discharge through the window to the interior heating device. Scratches and normal service deterioration of the window which adversely affect the strength of the window and/or reduce the window thickness could conceivably reduce the dielectric strength to one-half or one-third of its original strength, thus reducing the electric potential required to discharge through the window.

More particularly, a direct static charge accumulation results in flashover that punctures small holes in the outboard ply and discharges into the heating circuit of the window, damaging the ply, the heating system filament wires, (if applicable) and the interlayer in which the heating circuit is situated. It is, therefore, necessary to provide some facility for dissipating static charge before it reaches an electric potential value sufficient to discharge through the window.

A method for preventing static charge buildup on the outboard surface of an aircraft window is to coat the outboard window surface with an electroconductive anti-static coating or film. A problem with coating the window surface with these anti-static coatings or films is that the Federal Aviation Regulation Part 23 which applies to general aviation aircraft currently requires a minimum of 70% light transmittance through the total viewing area of the windshield, i.e. 70% of the visible light range must be able to enter the aircraft through the windshield. Windshields having presently available coatings and films will pass less than 70% of the visible light so that this Federal Aviation Agency regulation is not met.

It is therefore desirable to have techniques for effectively dissipating static charge from an aircraft windshield while meeting FAA light transmittance regulations.

2B. Patents of Interest

U.S. Pat. No. 4,078,107 to Bitterice et al. teaches a lightweight aircraft window having a heating circuit embedded the full depth of the outboard plastic ply and an anti-static circuit embedded just beneath the outboard surface of the window. The anti-static circuit provides an electrically conductive path of thin static-charge dissipating wires parallel to the outboard surface of the window covered with a plastic overlayer for dissipation of static charge before the charge reaches a level sufficient to cause electrical discharge from the outboard surface of the window to the interior heating circuit. It should be noted that because the charge collected on the window surface must travel through the plastic overlayer to reach the dissipating wires, the charge can still create small holes or punctures therein.

U.S. Pat. Nos. 4,323,946 to Truax and 4,590,535 to Mang each teach static charge dissipating circuits wherein electroconductive members extend at least partially through the thickness of the outer windshield ply to the outer surface. The inboard end of these electroconductive members are interconnected by way of either longitudinally extending wire members embedded in the outboard ply or an electroconductive surface at the interface between the outboard ply and the next inboard ply.

U.S. Pat. No. 4,382,881 to Levy discloses an anti-static coating exhibiting a desired value of surface resistivity, but which is substantially free from metal particles. This type of coating is used on the surface of nonmetallic elements of an aircraft such as radomes protecting an antenna, which if made too conductive, may become opaque to electromagnetic radiation by modifying their radio-electrical transparency.

U.S. Pat. No. 4,571,361 to Kawaguchi et al. teaches an anti-static film including a coating layer having electrically conductive fine particles dispersed in a compound containing an unsaturated bond capable of undergoing polymerization via radiation or a binder containing a polymerizable compound. The resulting dispersion is coated on the plastic film, polymerized, and cured via radiation.

U.S. Pat. No. 4,607,313 to Shaw et al. teaches a static discharger for discharging charge accumulation from the surface of the wing of an aircraft. A generally flat, non-conductive member is configured to conform to the shape of a portion of the wing surface. A flat base member is configured so as to be capable of being placed in conforming relationship with at least a portion of the surface of the non-conductive member which electrically insulates the base member from the surface of the aircraft. A plurality of strands formed of discharging material are embedded in the base member and are electrically connected to the wing surface of the aircraft so that charge accumulation passes from the wing surface of the aircraft to the plurality of strands to be discharged at the trailing end of the strands.

SUMMARY OF THE INVENTION

This invention provides a precipitative static drain strip system for dissipating static charge collected on the surface of a non-conductive substrate including electroconductive film elements positioned along selected portions of a major surface of the substrate and electrically interconnected. The interconnected elements are grounded to remove the accumulated charge from the substrate. In one particular embodiment of the invention, both the substrate and the film elements are transparent and the film elements are sized and positioned such that there is a minimum average light transmission of 70% through the substrate and film assembly. The film may be a metal oxide, such as tin oxide or indium tin oxide.

In another embodiment of the invention, additional transparent substrates are secured to the first substrate to form a composite transparency suitable for an aircraft window. In addition, a heating circuit is provided to heat the window. The electroconductive film elements are insulated from the heating circuit, and in a preferred embodiment of the invention, the film elements are on the outwardly facing major surface of the first substrate such that the first substrate insulates the film elements from the heating circuit.

The invention further provides a method for dissipating static electric charge collected on a non-conductive substrate. Electroconductive film elements are provided along selected portions of a major surface of the substrate and are interconnected and grounded such that static charge accumulated by the film elements passes therethrough and to a ground to remove the charge accumulation from the substrate. In one particular embodiment of the invention, the substrate is transparent and additional transparent substrates are secured to the first substrate to form a composite transparency suitable for an aircraft window. In addition, a heating circuit is provided in the additional substrates to heat the composite transparency. The electroconductive members are preferably positioned on the exposed major surface of the transparency so that the first substrate electrically insulates the electroconductive film members from the heating circuit.

DETAILED DESCRIPTION OF THE INVENTION

Figure 1:
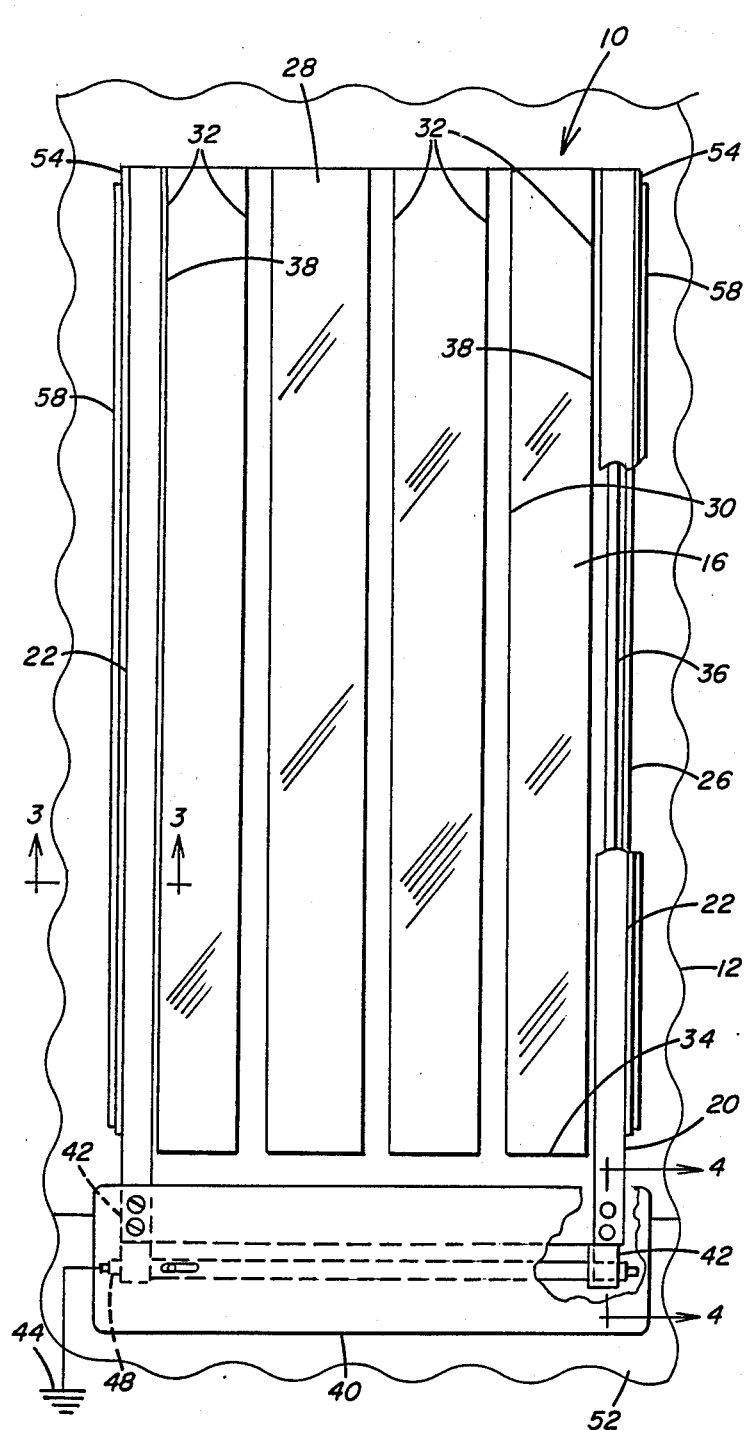
FIG. 1 is a plan view of a transparent window appendage assembly having an anti-static circuit constructed in accordance with the teachings of the invention.
Figure 2:
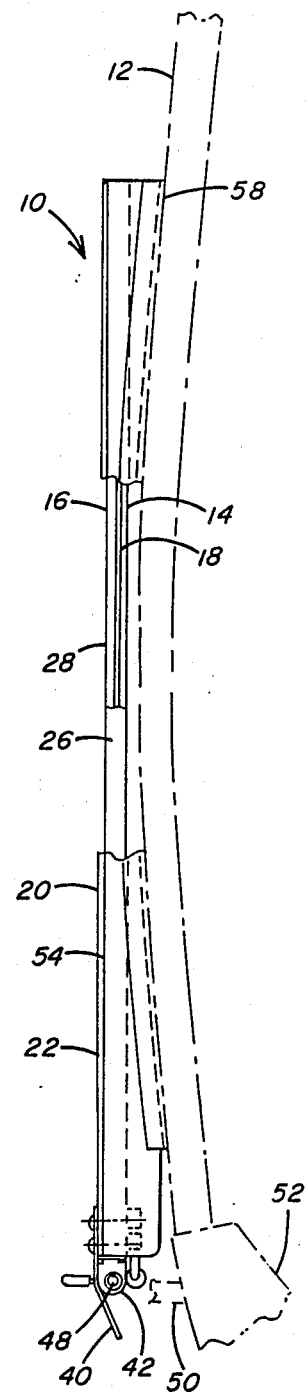
FIG. 2 is a side view of the window assembly illustrated in FIG. 1.
Figures 3, 4:
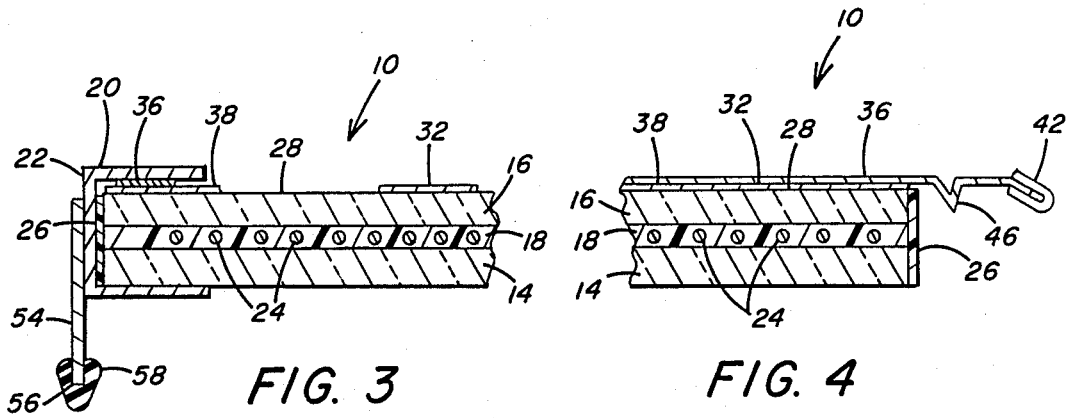
FIG. 3 is a cross-sectional view taken through line 3—3 of FIG. 1 showing the anti-static film, heating grid wires and assembly frame of the present invention.
FIG. 4 is a sectional view taken through line 4—4 of FIG. 1 illustrating the grounding arrangement of the present invention, with portions removed for clarity.

FIGS. 1 and 2 illustrate a transparent laminated window assembly 10 which is mounted outboard of an aircraft windshield 12. In the particular embodiment illustrated in FIGS. 1 and 2, the assembly 10 includes inner and outer transparent rigid non-conductive plies 14 and 16, preferably glass, plastic interlayer 18, and a transparency frame 20 including channel members 22. Although not limited in the present invention, in the preferred embodiment, the frame 20 is an electrically conductive frame made of aluminum. Referring to FIGS. 3 and 4, a heating means which includes wires 24 embedded within interlayer 18, provide anti-fogging and de-icing capabilities for at least that portion of the windshield 12 which the window assembly 10 covers. As shown in FIG. 3, moisture barriers 26 seal the window 10 and prevent water from entering interlayer 18 and causing swelling of the assembly 10. As discussed, supra, static charges will accumulate on the outboard surface 28 of the outer ply 16 of the assembly 10 which, if not removed, will discharge through the outer ply 16 to the heating wires 24 resulting in localized heating in the vicinity of the discharge path holes in the window 10 along the discharge path and possible damage to the heating wires 24. As a result, the assembly 10 is provided with a precipitative static drain strip system 30 which include features of this invention.

The static drain strip system 30 includes a plurality of interconnected transparent electrocondcctive strip elements 32 such as, for example, a metalic film, that will accumulate and draw the static charge from the outboard surface 28 of the outer ply 16. Referring to FIG. 1, the strip elements 32 extend longitudinally along the outer ply 16 and are interconnected by a transversely extending strip element 34. Conductive drain tabs 36 preferably copper strips are secured along outer elements 38 and extend to a transparency support bracket 40 where they are secured by clamps 42. The clamps 42 are connected to a suitable ground 44, e.g., the aircraft frame or aircraft electrical system ground. In this manner, static charge accumulated on the outboard surface 28 is provide with a controlled conductive path to carry the charge away from the surface 28 via elements 32 and copper tabs 36 for dissipation to ground 44, thereby preventing the surface charge from reaching an electric potential sufficiently lodged to spontaneously discharge through the ply 16.

A strain relief arrangement is provided between the window assembly 10 and a clamp 42 to allow for thermal expansion and contraction of the assembly 10 independent of the frame 20 and/or bracket 40 while maintaining electrical connection between the static drain strip system 30 and ground 44. In the particular embodiment illustrated in FIG. 4, a portion 46 of the copper tabs 36 extends beyond the window assembly 10 and is folded or crimped to compensate for any dimensional variations.

Referring to FIGS. 1, 2 and 3, the frame 20 is secured to bracket 40 which includes a set of spring-loaded pin assemblies 48 that extend through mounts 50 on airframe 52 to pivotally secure the assembly 10 to the aircraft. Skirt mounts 54 are secured to channels 22, frame 20 and the lower edge 56 of the skirt mounts 54 is provided with a contoured rubber skirt 58. The skirts 58 conform to the outboard configuration of the aircraft windshield 12 so as to form a seal between the window assembly 10 and aircraft windshield 12 as shown in FIG. 2.

The resistance of the anti-static conductive surface coating must be low enough so that the current resulting from static charge buildup will drain through the coating rather than through the dielectric outer ply 16 to the heating wires 24. If the coating resistance is too high, the accumulated static charge will arc through the outer ply 16 to the heating wires 24 prior to draining from the window assembly 10 in a safe manner. Generally, the thinner the film layer, the higher the eesistance. In addition, the spacing of the strip elements 32 must be such that the charge potential required for the static charge to "leak", i.e., move along the outer surface 28 of ply 16 to a strip element 32 is less than the potential required for the accumulated charge to discharge through outer ply 16. If the leakage potential is too high due to strip element spacing, the static charge will discharge through ply 16 before it can move to a strip element 32 and be drained from the window assembly 10.

In one particular embodiment of the invention, the assembly 10 includes 0.090 inch (2.3 mm) thick thermally tempered glass inner and outer plies, with a polyvinyl butyral interlayer. The static drain circuit includes 0.5 inch (1.27 cm) wide tin oxide strips spaced at 2.12 inches (5.38 cm) centers and drain tabs of 5/16 inch wide by 0.003 inch thick (7.9 mm×0.076 mm) copper tape. The film thickness of the strip system 30 was sufficient to provide a resistance of approximately 100K, i.e., 100,000 ohms. With this configuration, the window assembly 10 provides a minimum average light transmittance of 70% through the window and meets FAA regulations.

As can be appreciated, the optimal width thickness and spacing of the elements 32 for an aircraft window 10 depends on many factors, such as, for example the dielectric strength of the outer ply 16, resistance and thickness of the elements 32 and desired percentage of light transmittance.

It is understood that the present invention is not limited to metallic coatings and that any transparent electroconductive material e.g., indium tin oxide or other metal oxides or electroconductive plastic films, may be used as the strip elements 32 on the outer ply 16. Furthermore, the strip configurations may vary as long as the strips provide an interconnected drain circuit and meeting the FAA regulations for minimum light transmittance.

In addition, the inner and outer plies 14, 16 are not limited to glass plies. Other rigid, transparent material may be used such as acrylic, polycarbonate polyester or hard polyurethane. Care should be taken when using a plastic outer ply 16 that the technique used for coating the ply with the electroconductive film does not distort the optical quality of the transparency. Coating techniques such as pyrolytic and cathode vacuum deposition which require high temperatures, will not affect a glass ply but may adversely distort the optical quality of a plastic ply. Vacuum evacuation and magnetic sputtering deposition do not require a high temperature environment and may be used to coat plastics.

Figure 5:
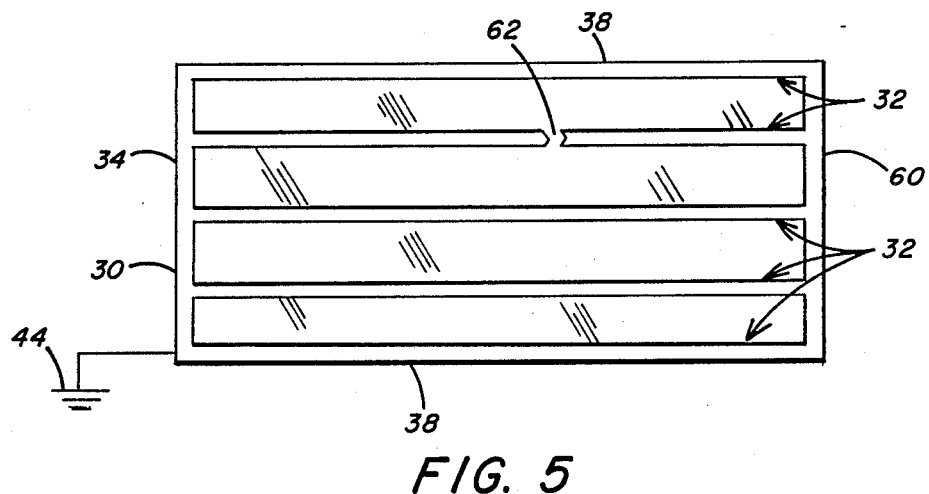
FIG. 5 is view similar to FIG. 1 showing an alternate arrangement for the static drain drip system, with portions removed for clarity.

It should be noted that with this arrangement, the precipitative static drain strip system 30 remains operative even if a discontinuity, such as a break in one of the elements 32, occurs. More Particularly, each strip is independently interconnected to transverse element 34 which is grounded at both ends to ground 44. As can be appreciated, a single discontinuity in any of the independent strip element portions will not prevent collected charge from being dissipated to the ground, but will simply cause the charge that would be collected in that portion of the element 32 to travel to the next adjacent strip elements. If desired, additional transversely extending strip elements, such as element 60 as shown in FIG. 5, may be positioned opposite element 34 so that if there is a break 62 in a element 32, the collected charge in the strip element portion 64 simply has to travel to element 60 and then back to the ground 44 via outer elements 38.

The desired pattern for the electroconductive strips may be applied to the outer ply 16 in any of a number ways known in the art. In one particular method of fabrication, the outboard surface 28 of the outer ply 16 is coated with an electroconductive film, such as tin oxide. The coating may be applied simultaneously with another operation, e.g., a tempering operation. Next, the coated glass is masked e.g., with Spraylat ® A-tinted, available from Spraylat ® Corporation, Moutt Vernon, N.Y., to coat that portion of the film that is to remain on the glass for the final product. The glass sheet is then de-coated so that only the masked portion remains. Lastly, the mask is removed leaving the electroconductive strip film arrangement.

The window assembly 10 is a self-contained heating and anti-static transparency suitable for use as an outboard ply for a composite aircraft transparency that provides the required static charge drain necessary to prevent discharge through the outer plies of the transparency while meeting FAA light transmittance requirements. Although presented as a window assembly that is added on to an existing aircraft windshield, the assembly may be laminated to additional structural plies to form an aircraft windshield with integral heating and anti-static capabilities.

It is understood that the particular configuration as discussed, supra, is not limiting to the invention an that further modifications can be made without departing from the spirit of the invention, the scope of which is defined in the claims which follow.

We claim:

1. A device to reduce static charge accumulation on an aircraft window, comprising:
    a transparent substrate:
    a plurality of transparent electroconductive film elements along selected portions of a major surface of said substrate, wherein said substrate and said film elements provide a predetermined level of light transmissivity;
    means to electrically interconnect said film elements;
    means to connect said interconnected film elements to a ground; and
    means to mount said substrate in close, overlaying proximity to a major surface of said aircraft window.

2. The device as in claim 1 wherein said film elements include longitudinally extending rows of film elements interconnected by at least one transversely extending film element.

3. The device as in claim 2 wherein said device has an average light transmissivity of at least 70 percent.

4. The device as in claim 1 wherein said film is a metal oxide.

5. The device as in claim 4 wherein said film is tin oxide.

6. The device as in claim 4 wherein said film is indium tin oxide.

7. The device as in claim 1 wherein said substrate is a first substrate and further including:
    a second transparent substrate with a first major surface secured to a major surface of said first substrate;
    means for electrically heating on of said substrates, said heating means mounted on said first major surface of said second substrate wherein said first substrate is secured to and overlies said second substrate with a portion of said heating means between said first substrate and second substrate; and
    means for electrically insulating said electroconductive film elements from said heating means.

8. The device as in claim 7 wherein further said electroconductive film elements are positioned along an exposed major surface of said first substrate and said electrically insulating means is said first substrate.

9. The device as in claim 8 further including one or more additional transparent substrates secured to a second major surface of said second substrate to form a composite transparency.

10. A method of reducing static charge accumulation on an aircraft window, comprising the steps of:
   positioning a transparent substrate in close overlaying proximity to an exposed major surface of said aircraft window, said substrate having a plurality of spaced, transparent, electroconductive film elements along selected portions of a major surface of said substrate;
   electrically interconnecting said film elements;
   collecting electric charges on said substrate with said interconnected film elements; and
   moving said collected charges through said elements to a ground.

11. The method as in claim 10 wherein said providing step includes providing longitudinally extending rows of electroconductive elements interconnected by at least one transversely extending electroconductive element.

12. The method as in claim 11 wherein said substrate is a first substrate and further including the step of securing one or more additional substrates to an opposing major surface of said first substrate.

13. The method as in claim 12 further including the steps of providing an electrically heating device between said first substrate and said additional substrate.

* * * * *